US012053421B2

(12) United States Patent
Hutchison et al.

(10) Patent No.: US 12,053,421 B2
(45) Date of Patent: Aug. 6, 2024

(54) HOSPITAL BED CPR ACTIVATION ASSEMBLY

(71) Applicant: Hill-Rom Services, Inc., Batesville, IN (US)

(72) Inventors: Stephen E. Hutchison, Batesville, IN (US); Omar H. Dozal, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 257 days.

(21) Appl. No.: 17/703,330

(22) Filed: Mar. 24, 2022

(65) Prior Publication Data

US 2022/0313513 A1 Oct. 6, 2022

Related U.S. Application Data

(60) Provisional application No. 63/169,009, filed on Mar. 31, 2021.

(51) Int. Cl.
*A61G 7/015* (2006.01)

(52) U.S. Cl.
CPC .................................... *A61G 7/015* (2013.01)

(58) Field of Classification Search
CPC ........ A61G 7/015; A61G 7/018; A61G 7/012; A61G 7/05; A61G 7/002; A61G 7/0509; A61G 7/0514; A61G 13/101; A61G 13/10; A61G 13/121; A61G 13/12; A61G 13/1285; Y10T 74/1888; Y10T 74/18576
USPC ... 5/600, 618, 613, 616, 611, 430, 424, 510, 5/662; 180/19.3; 74/89.23, 98; D12/128
See application file for complete search history.

(56) References Cited

U.S. PATENT DOCUMENTS

| | | | | |
|---|---|---|---|---|
| 4,751,754 | A | 6/1988 | Bailey et al. | |
| 4,953,243 | A | 9/1990 | Birkmann | |
| 5,329,657 | A | 7/1994 | Bartley et al. | |
| 5,444,880 | A * | 8/1995 | Weismiller ............. | A61G 7/015 5/616 |
| 5,484,393 | A | 1/1996 | Mccoy | |
| 5,820,573 | A | 10/1998 | Ramos | |
| 6,000,076 | A | 12/1999 | Webster et al. | |
| 6,226,816 | B1 | 5/2001 | Webster et al. | |
| 7,055,195 | B2 | 6/2006 | Roussy | |
| 7,644,458 | B2 | 1/2010 | Foster et al. | |
| 7,836,531 | B2 | 11/2010 | Girard et al. | |
| 7,926,131 | B2 | 4/2011 | Vanderpohl, IIII et al. | |
| 7,932,473 | B2 | 4/2011 | Srensen et al. | |
| 7,935,901 | B2 | 5/2011 | Srensen et al. | |

(Continued)

OTHER PUBLICATIONS

European Search Report in related EPO Application No. 22159810.5-1113, dated Jul. 19, 2022, 6 pages.

(Continued)

*Primary Examiner* — David R Hare
*Assistant Examiner* — Madison Emanski
(74) *Attorney, Agent, or Firm* — Barnes & Thornburg LLP

(57) ABSTRACT

An activation assembly for activating a release mechanism of a drive for a patient support apparatus includes a pivot pin, a bracket, bias member, and handle pivotable about the pivot pin. Force applied to the handle results in movement of the bracket, bias member, and handle about the pivot pin when the force is sufficient to overcome the bias of the bias member. Movement of the bracket results in the motion being transferred to the release mechanism.

23 Claims, 11 Drawing Sheets

(56) References Cited

U.S. PATENT DOCUMENTS

| | | | |
|---|---|---|---|
| 8,413,274 | B2 | 4/2013 | Ulrich et al. |
| 9,295,598 | B2 | 3/2016 | Roussy et al. |
| 10,905,606 | B2 | 2/2021 | Trepanier et al. |
| 2003/0167569 | A1 | 9/2003 | Newkirk et al. |
| 2007/0174965 | A1 | 8/2007 | Lemire et al. |
| 2009/0012437 | A1 | 1/2009 | Tucker et al. |
| 2009/0031498 | A1 | 2/2009 | Girard et al. |
| 2014/0260730 | A1 | 9/2014 | Wu |
| 2017/0216122 | A1 | 8/2017 | White |
| 2018/0161225 | A1 | 6/2018 | Walke et al. |

OTHER PUBLICATIONS

Excerpt from Hill-Rom VersaCare(TM) Bed Service Manual, Feb. 2004, 15 pages.

* cited by examiner

HOSPITAL BED CPR ACTIVATION ASSEMBLY

PRIORITY CLAIM

This application claims priority under 35 U.S.C. § 119(e) to U.S. Provisional Application No. 63/169,009, filed Mar. 31, 2021, which is expressly incorporated by reference herein.

BACKGROUND

The present disclosure is related to an activation assembly for a release mechanism of a drive of a patient support apparatus, such as a hospital bed. The activation assembly includes a bias member having two arms that allow the bias member to be used in multiple locations and operate to balance the activation assembly when it is not in an activated position.

The use of release mechanisms in drives for patient support apparatuses such hospital beds and stretchers is known as a way to quickly lower a frame section using gravity and/or patient weight. The activation of the release mechanism is typically manual and transfers mechanical movement between an activation handle and the release mechanism to make the release available even when power is not available. In some instances, the release mechanism mechanically releases portions of the drive to allow the drive to be back driven to a lowered position. In other cases, the release mechanism may vent or dump hydraulic fluid or air from a cylinder to allow the cylinder to be lowered.

However, due to misuse, the structures used may be damaged such as by overuse when housekeeping uses the release mechanism to quickly lower the frame during a cleaning cycle, or when visitors activate the activation handle out of curiosity or boredom, cycling the structure more often than appropriate. Still further, the activation handle may be damaged by caregivers who activate the release mechanism in an emergency situation, applying excessive force in an attempt to urge the frame to move quicker. This overuse can result in a loss of adjustment and a freedom of movement that is problematic.

SUMMARY

The present disclosure includes one or more of the features recited in the appended claims and/or the following features which, alone or in any combination, may comprise patentable subject matter.

According to a first aspect of the present disclosure, an activation assembly for activating a release mechanism of a drive for a patient support apparatus comprises a pivot pin, a bracket, a bias member, and a handle. The pivot pin is configured to engage a support member of a patient support apparatus. The bracket is positioned on the pivot pin and pivotable about the pivot pin relative to the patient support apparatus. The bracket includes a lever arm configured to engage a motion transfer link coupled to the release mechanism such movement of the link arm is transferred through the transfer link to the release mechanism. The bias member is engaged with the bracket to move with the bracket and configured to engage a pair of spaced apart motion limiters secured to the support member of the patient support apparatus. The bias member maintains engagement with both motion limiters when the activation assembly is in a neutral state. The handle coupled to the bias member, the movement of the handle resisted by the bias member and transferred from the handle to the lever arm.

In some embodiments of the first aspect, the bias member may include a body and a pair of arms positioned on opposite sides of the body, the arms may each be configured to engage a respective motion limiter when the activation assembly is in a neutral state.

In some embodiments of the first aspect, a first one of the pair of arms may deflect when the handle is moved in a first direction and a second of the pair of arms may disengage the respective motion limiter.

In some embodiments of the first aspect, the first one of the pair of arms may urge the activation assembly to the neutral position when the handle is released.

In some embodiments of the first aspect, the activation assembly may further comprise a coupler cam that is positioned on the pivot pin and pivotable about the pivot pin. When present, the coupler cam may be secured to the bracket to move with the bracket about the pivot pin. The coupler cam may include a cam surface configured to engage an activation arm of a switch assembly and activate the switch when the activation assembly is moved from the neutral position to an activated position.

In some embodiments of the first aspect, the coupler cam may include a pin extending therefrom and the bracket may include a hole in a surface of the bracket. The pin of the coupler cam may be positioned in the hole of the bracket to secure the pin to the bracket.

In some embodiments of the first aspect, each of the pair of arms may form protuberant sections that define a space therebetween. The pin of the coupler cam, when positioned in the hole of the bracket, may extend into the space between the protuberant sections. The pin may constrain movement of the bias member relative to the bracket.

In some embodiments of the first aspect, the bias member may engage with the bracket such that portions of the bias member are free to move relative to the bracket.

In some embodiments of the first aspect, the bias member may comprise a body that is symmetrical about a centerline. The body may have a top with a first side that has a generally planar first surface and a second generally planar second surface offset from the first surface. The body may have a first end having a first width, symmetrical side walls that define an increasing width of the body for a first distance and a decreasing width of the body for a second distance terminating at the second end, the pair of arms extending from the second end.

In some embodiments of the first aspect, the arms may form complex curvilinear structures that are symmetrical about the centerline. The arms may each have a protuberant first section that extends from the second end in a first direction. When present, the protuberant first section may curve around to have a second section flaring out from the body to a free end. In some embodiments the arm may have a varying width to control the spring rate of the arm.

In some embodiments of the first aspect, the arms may form leaf springs.

In some embodiments of the first aspect, the body may have a bottom, opposite the top, with a mounting flange extending from the bottom.

In some embodiments of the first aspect, the bias member may comprise a body and a pair of leaf springs that extend from the body, the leaf springs positioned on opposite sides of the body.

In some embodiments of the first aspect, the thickness of the leaf springs may vary along the length of the leaf spring to vary the spring rate of the leaf spring.

According to a second aspect of the present disclosure, a patient support apparatus comprises a first frame, a second frame pivotably coupled to the first frame, a drive, and an activation assembly. The drive is secured to the first frame and the second frame and operable to move the second frame relative to the first frame. The drive includes a release mechanism which is operable to disengage a portion of the drive to allow the second frame member to move freely relative to the first frame. The activation assembly includes a pivot pin, a bracket, a bias member, and a handle. The bracket is positioned on the pivot pin and pivotable about the pivot pin relative to the first and second frame. The bracket includes a lever arm engaged with a motion transfer link coupled to the release mechanism such movement of the link arm is transferred through the transfer link to the release mechanism. The bias member is engaged with the bracket to move with the bracket and configured to engage a pair of spaced apart motion limiters. The bias member maintaining engagement with both motion limiters when the activation assembly is in a neutral state. The handle is coupled to the bias member, the movement of the handle resisted by the bias member and transferred from the handle to the lever arm to thereby activate the release mechanism.

In some embodiments of the second aspect, the bias member may comprise a body and a pair of leaf springs that extend from the body. The leaf springs may be positioned on opposite sides of the body.

In some embodiments of the second aspect, the leaf springs may engage the motion limiters.

In some embodiments of the second aspect, a first one of the pair of leaf springs may deflect when the handle is moved in a first direction and a second of the pair of leaf springs may disengage the respective motion limiter when the handle is moved in the first direction.

In some embodiments of the second aspect, the first one of the pair of leaf springs may urge the activation assembly to the neutral position when the handle is released.

In some embodiments of the second aspect, the activation assembly may further comprise a coupler cam and a switch assembly having an activation arm. The coupler cam may be positioned on the pivot pin and pivotable about the pivot pin. The coupler cam may be secured to the bracket to move with the bracket about the pivot pin. The coupler cam may include a cam surface engaging the activation arm of the switch assembly. The coupler cam may activate the switch when the activation assembly is moved from the neutral position to an activated position.

In some embodiments of the second aspect, the coupler cam may include a pin extending therefrom and the bracket may include a hole in a surface of the bracket. The pin of the coupler cam may be positioned in the hole of the bracket to secure the pin to the bracket.

In some embodiments of the second aspect, the bias member may engage with the bracket such that portions of the bias member are free to move relative to the bracket.

In some embodiments of the second aspect, the bias member may comprise a body that is symmetrical about a centerline. The body may have a top with a first side that has a generally planar first surface and a second generally planar second surface offset from the first surface. The body may have a first end having a first width, symmetrical side walls that define an increasing width of the body for a first distance and a decreasing width of the body for a second distance terminating at the second end, the pair of arms extending from the second end.

In some embodiments of the second aspect, the arms form complex curvilinear structures that are symmetrical about the centerline. The arms each may have a protuberant first section that extends from the second end in a first direction. The protuberant first section may curve around to have a second section flaring out from the body to a free end. The arm may have a varying width to control the spring rate of the arm. In some embodiments, the arms may form leaf springs.

In some embodiments of the second aspect, the body may have a bottom, opposite the top, with a mounting flange extending from the bottom.

In some embodiments of the second aspect, a first one of the pair of arms may deflect when the handle is moved in a first direction and a second of the pair of arms may disengage the respective motion limiter. In some embodiments, the first one of the pair of arms urges the activation assembly to the neutral position when the handle is released.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
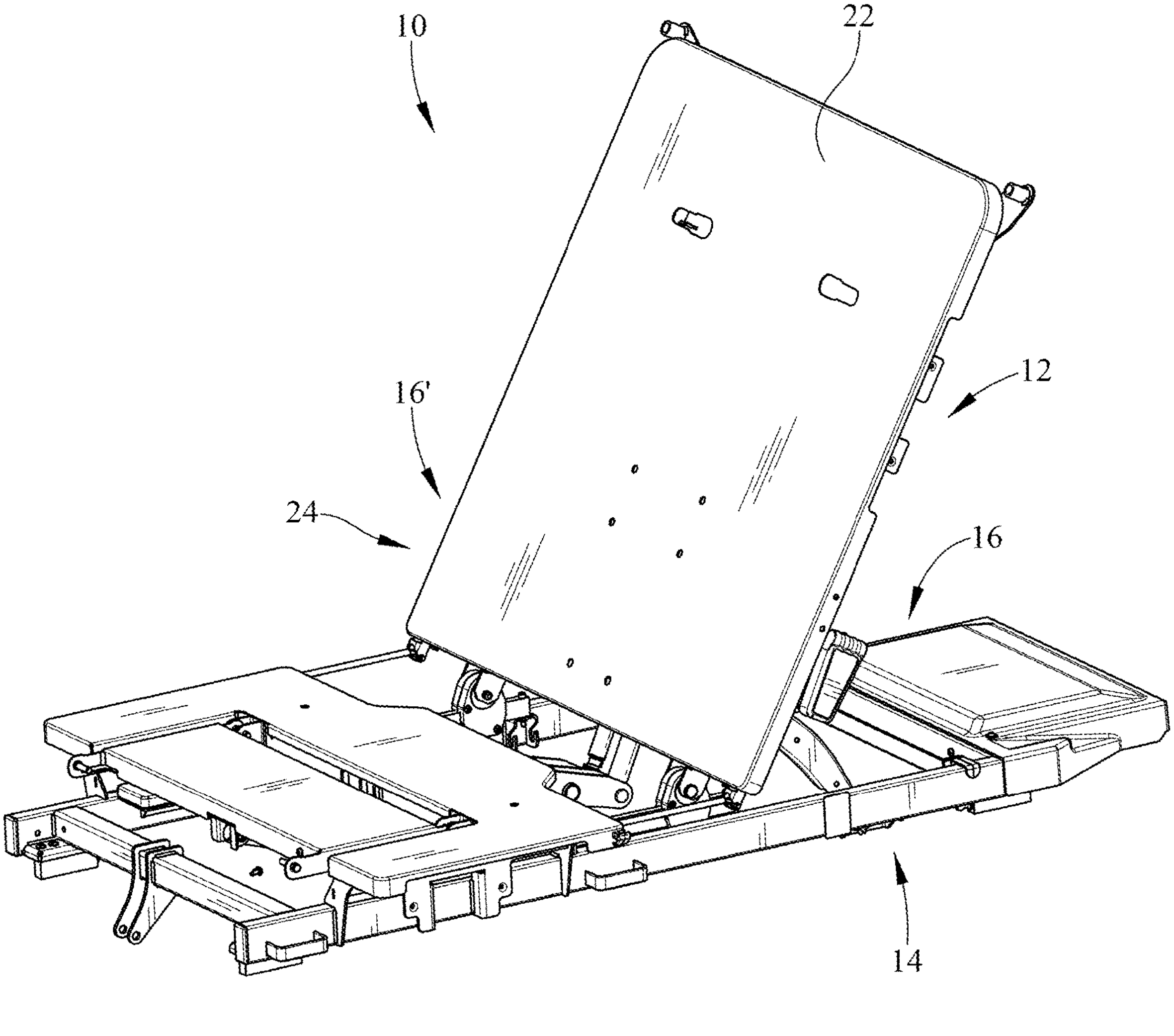
FIG. 1 is a perspective view of a portion of a patient support apparatus, FIG. 1 showing a head deck section in a raised position relative to an upper frame of the patient support apparatus, the head deck section being movable between a raised position and a lowered position by a linear actuator.

FIG. 1 shows a portion of a patient support apparatus 10 that includes similar CPR activation assemblies 16, 16' of the present disclosure positioned on opposite sides of a head deck section 20. FIG. 1 depicts an upper frame 14 and the head deck section 20 of a patient support apparatus 10 similar to the patient support apparatus disclosed in PCT Publication No. WO2016196403A1, published Dec. 8, 2016 and titled PATIENT SUPPORT APPARATUS, which is incorporated by reference herein for the disclosure of the details of a patient support apparatus which may alternatively include the activation assemblies 16, 16' of the present disclosure.

Figure 2:
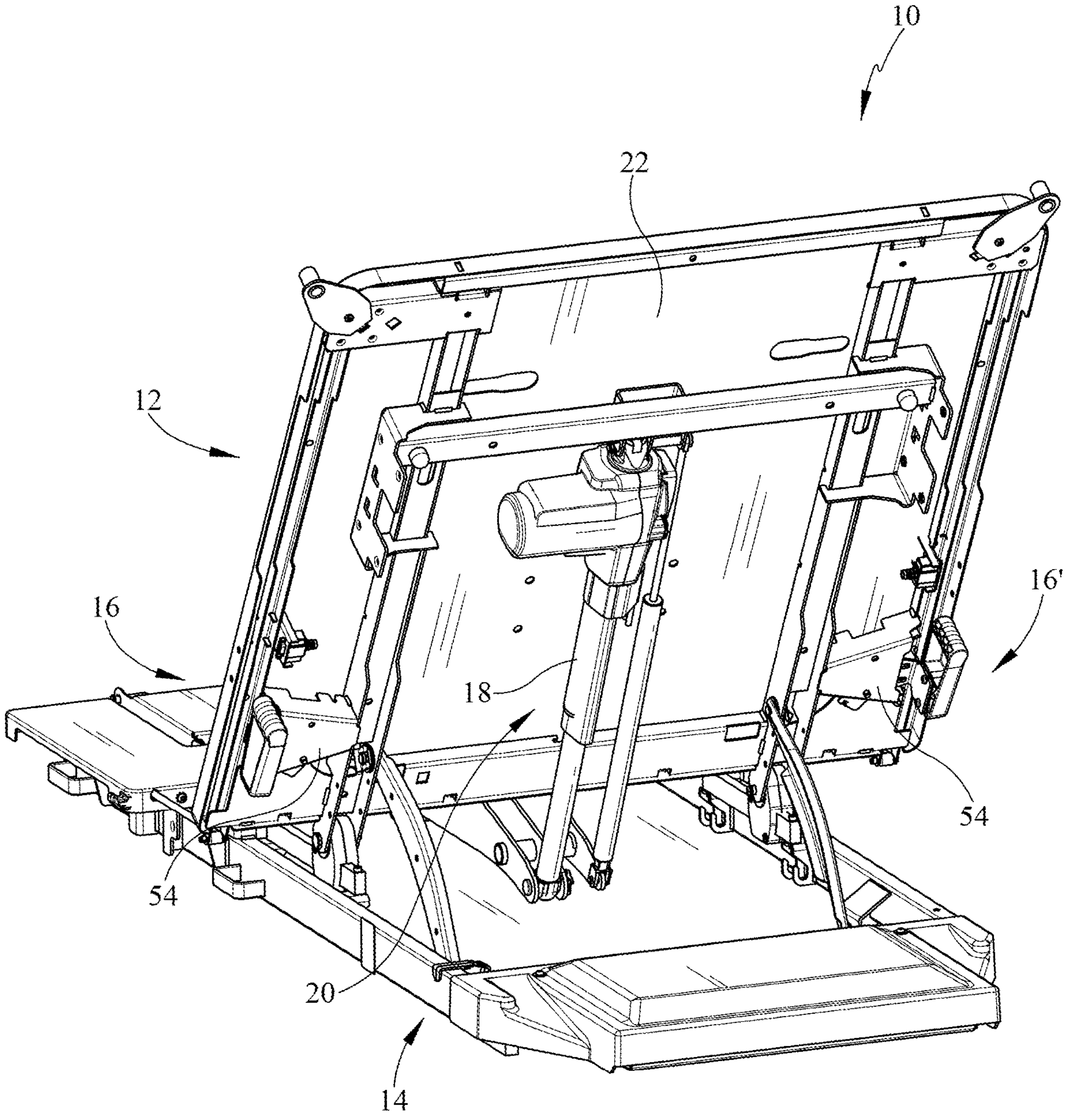
FIG. 2 is a perspective view of the portion of the patient support apparatus of FIG. 1 taken from a different viewpoint.

Referring to FIG. 2, the activation assemblies 16, 16' are operable to transfer motion to a release mechanism 18 of a head deck section drive 68. There are a multitude of linear actuator assemblies and hydraulic cylinders that may be released by motion of a motion transfer link, a motion transfer linkage or a cable assembly to release portions of the drive to move without being driven by a motor or hydraulic fluid. In many cases, the release mechanism is actuated by a caregiver to cause the bed section to be moved under gravity in an emergency situation. For example, the head deck section 20 may be released to lower to a flat configuration when a patient experiences cardiac arrest so that the caregiver(s) may provide emergency cardiopulmonary resuscitation on the patient. The focus of the present disclosure is on the activation assembly 16 which provides a particular approach for facilitating activation of the release mechanism(s) of known drive systems.

Figure 3:
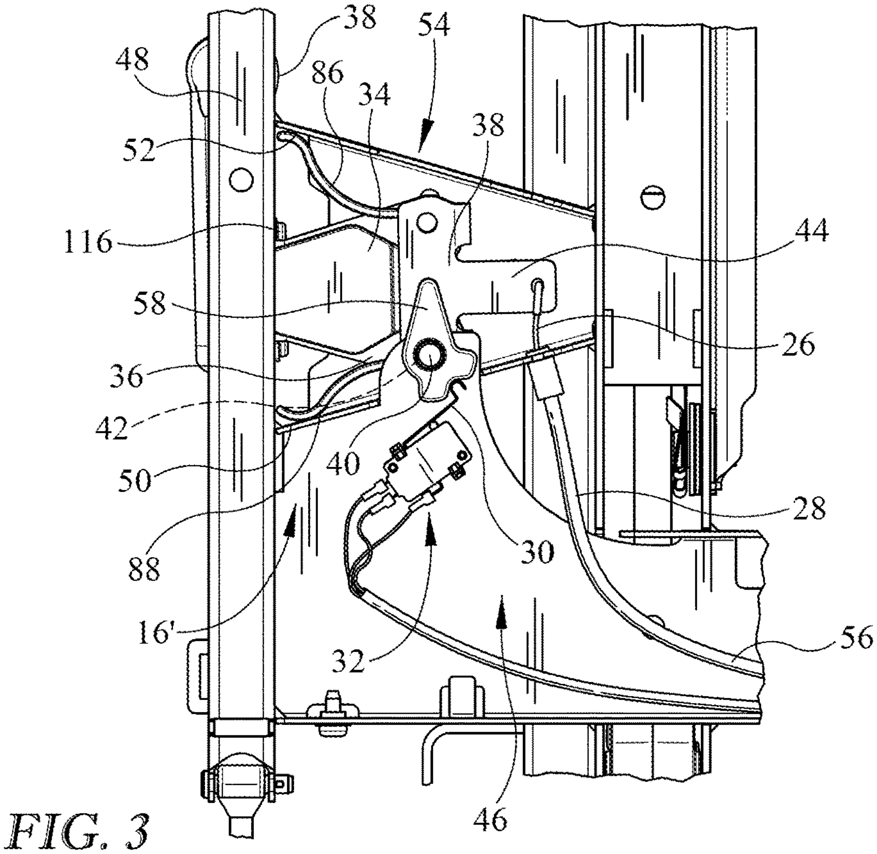
FIG. 3 is a perspective view of a portion of the patient support apparatus of FIG. 1, FIG. 3 showing an activation assembly positioned behind a head deck panel which has been removed in FIG. 3 to show additional details, the activation assembly of FIG. 3 shown in a neutral position where the activation assembly has not been activated.
Figure 4:
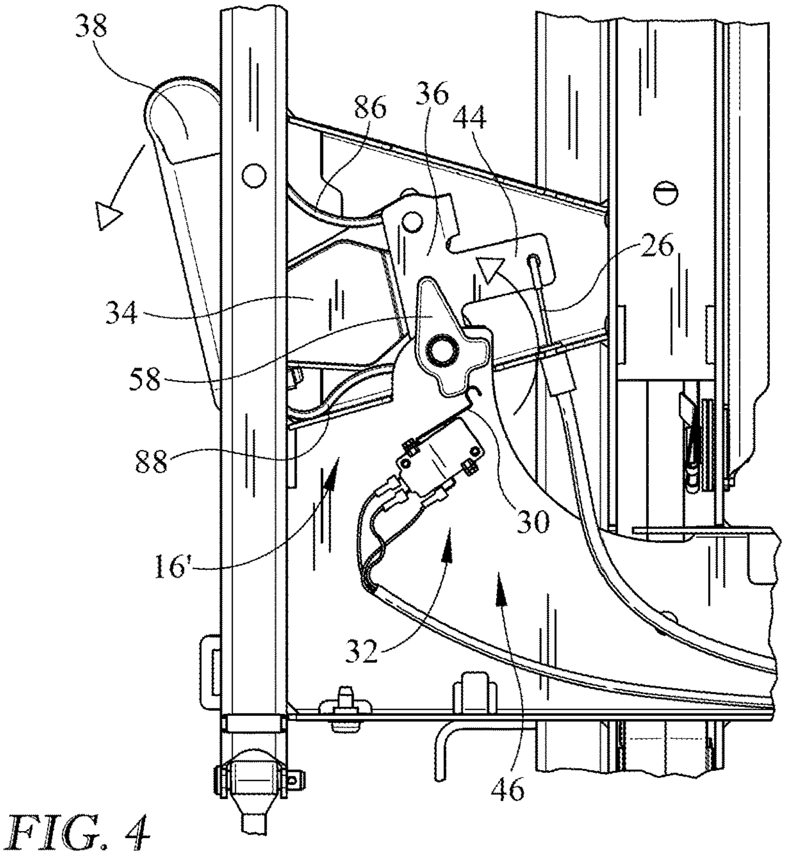
FIG. 4 is a view similar to FIG. 3, however the activation assembly shown in FIG. 4 has been moved to an activated position.
Figure 5:
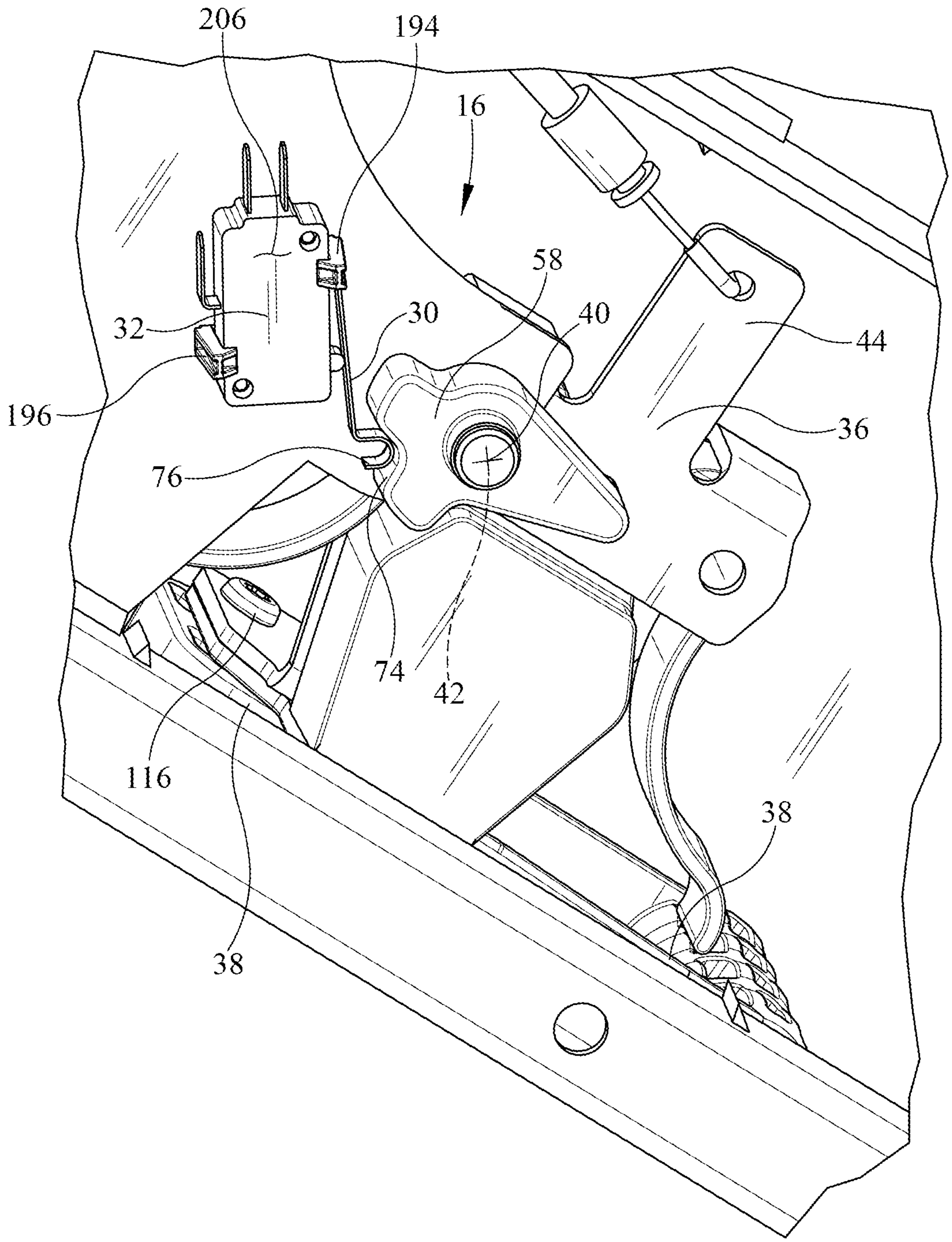
FIG. 5 is a view similar to FIGS. 3 and 4, but portions have been removed in FIG. 5 to show additional details, the activation assembly shown in FIG. 5 being mirror image of the activation assembly shown in FIGS. 3 and 4.
Figure 6:
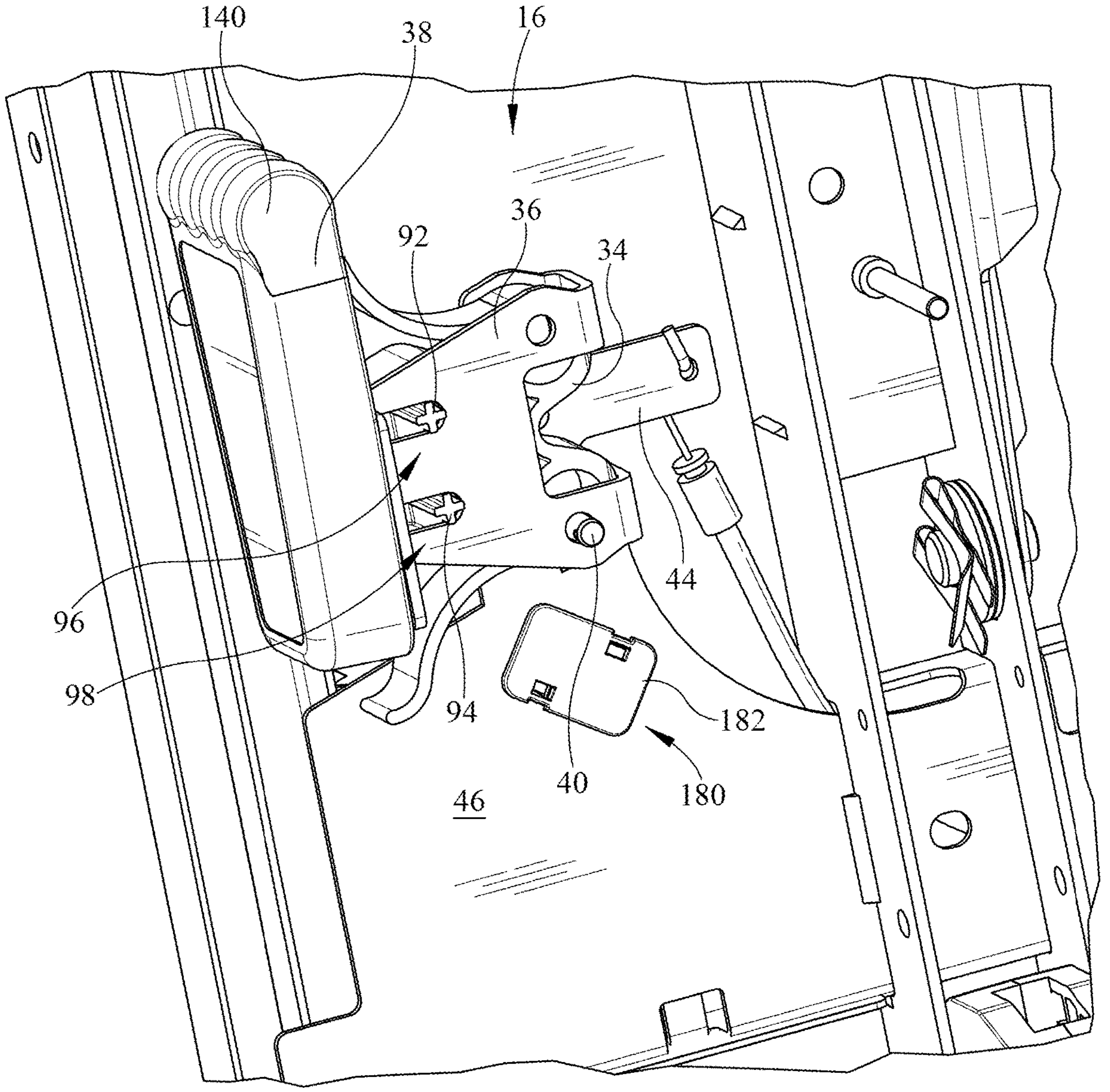
FIG. 6 is a view of the activation assembly of FIG. 5 taken from the opposite side of the activation assembly and with additional portions of the patient support apparatus removed.
Figure 11:
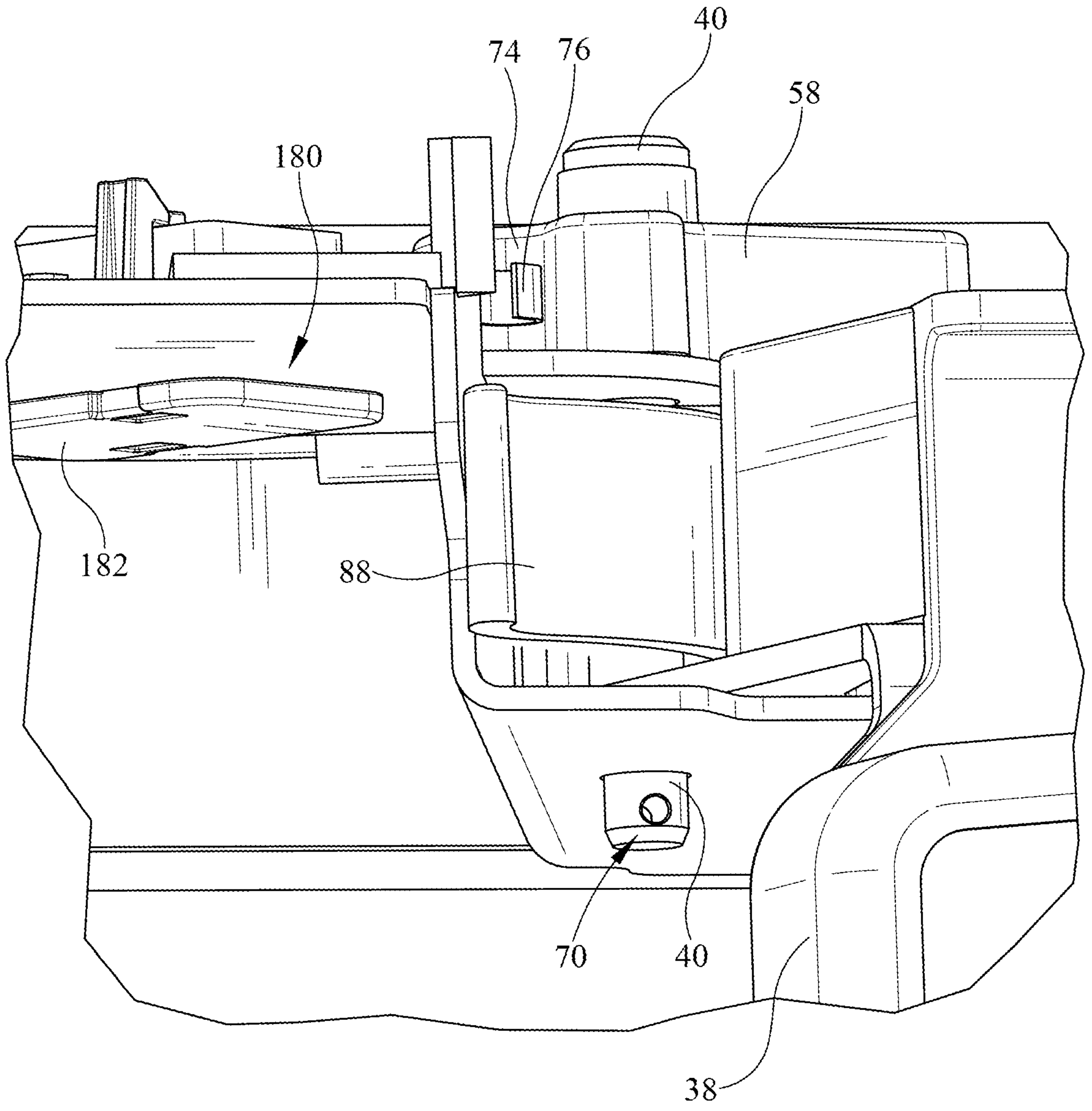
FIG. 11 is a detailed perspective view of a portion of the activation assembly with pieces removed to show particular details.

As a reference, FIGS. 3 and 4 show details of activation assembly 16' and FIGS. 5, 6, and 11 shown details of activation assembly 16. The component parts of each of the activation assemblies 16, 16' are the same, but the two activation assemblies 16, 16' are mirrored. Referring now to FIG. 3, the activation assembly 16' is shown with a head panel 22 (seen in FIGS. 1 and 2) removed so that the view is shown from the perspective of the arrow 24 shown in FIG. 1. FIG. 3 shows the activation assembly 16' in a neutral position such that a cable 26 of a cable assembly 28 and an activation arm 30 of a switch assembly 32 are in a neutral position. FIG. 4 shows the activation assembly 16 activated so that the cable 26 is extended and the activation arm 30 is moved to an activated position. When activated, the activation assembly 16 transfers motion to cable 26 which thereby acts on the release mechanism 18 to release the head deck section drive 68.

In addition, the activation arm 30 of the switch assembly 32 causes the switch to be activated to provide a signal to an electrical system of the patient support apparatus 10. This signal may be used by the patient support apparatus 10 to inform other systems of the patient support apparatus 10 to respond to the activation of the activation assembly 16 or may be sent to a hospital network to inform others that the activation assembly 16 has been activated.

Figure 12:
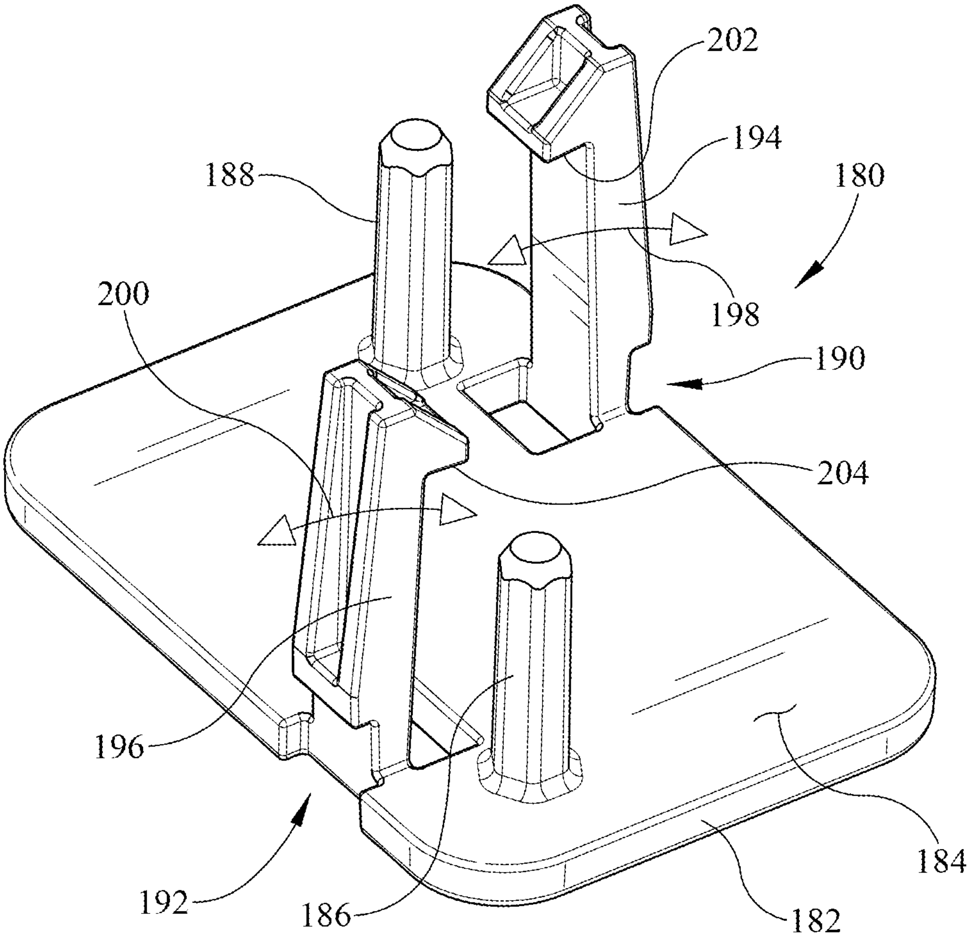
FIG. 12 is perspective view of a limit switch clip of the activation assembly.

The limit switch 32 is held in position by a limit switch clip 180 shown in FIG. 12. Referring to FIG. 5, the limit switch clip 180 includes two grip arms 194, 196 that are configured to secure the limit switch 32 against the support 46 with a snap-fit. A surface 204 of the limit switch 32 is engaged by respective grip surfaces 202, 204 (see FIG. 12) of the respective grip arms 194, 196. Referring to FIG. 6 and FIG. 12, the clip 180 is inserted through holes (not shown) formed in the support 46 with a base 182 having a surface 184 that engages the support 46. A pair of posts 186 and 188 are inserted through the support and the limit switch 32 is fitted onto the posts 186 and 188, the posts 186 and 188 serving to prevent rotation of the limit switch 32. The grip arms 194 and 196 are also formed to include respective grips 190 and 192 that act to secure the clip 180 to the support 46 even when the limit switch 32 is not present. As the arms 194, 196 are inserted through the support 46, they deflect as suggested by the respective arrows 198, 200 until the clip 180 is fully inserted. Once the clip 180 is inserted, the arms 194, 196, which are resiliently flexible, return to a neutral position such that the grips 190, 192 snap-fit securely to the support 46. To insert the limit switch, the arms 194, 196 are deflected in the opposite direction until the surface 206 slips under the grips 202, 204 and the arms 194, 196 are permitted to return to their neutral position securing the limit switch 32 with a snap fit.

Referring again to FIGS. 3 and 4, it can be seen that the activation assembly 16 includes a bias member 34, a bracket 36, and a handle 38, supported from the bias member 34 and bracket 36. The bias member 34, a bracket 36, and handle 38 pivot together about a pivot pin 40 which defines a pivot axis 42. The bracket 36 is formed to include a lever arm 44 which transfers motion to the cable 26, which acts as a motion transfer link to transfer the motion of the lever arm 44 to a release mechanism. While the present disclosure shows the lever arm 44 coupled to a cable 26, it should be understood that the lever arm 44 may act on any of a number of structures which transfer motion to a release mechanism without use of electrical power. For example, in some embodiments the cable assembly 28 may be omitted and replaced with a wire form or other fixed linkage. In still other embodiments, the lever arm 44 may be connected to a valve which causes fluid or air to be released from a hydraulic or pneumatic system to allow a cylinder to be lowered in an emergency and without electrical power.

The activation assembly 16 is supported from a support 46 coupled to a frame member 48 of the head deck section 12 with the pivot pin 40 securing the bias member 34, a bracket 36, handle 38, and a coupler cam 58 to the support 46 such that the bias member 34, a bracket 36, and handle 38 pivot relative to the support 46. It should be noted that the coupler cam 58 is reversed in activation assembly 16 as compared to activation assembly 16' as the bracket 36 can be used with either activation assembly 16 or 16' with only one of two holes 66 or 68 used, depending on which side of the head deck section 20 the activation assembly 16 or 16' is positioned. The activation assembly 16 further includes first and second opposed motion limiters 50 and 52 which are engaged by the bias member 34 as will be described in further detail below. The motion limiters 50 and 52 are embodied as flanges of a cover 54 that is secured to the frame member 48 and support 46. However, in other embodiments, the motion limiters 50 and 52 may be embodied as any structure that is fixed relative to the support so that movement of the bias member 34 relative to the support 46 may be resisted by the motion limiter 50 or 52. The cover 54 provides protection to the activation assembly 16 to reduce the potential for intrusion of fluids and/or biomaterials into the operating mechanism of the activation assembly 16.

Figure 9:
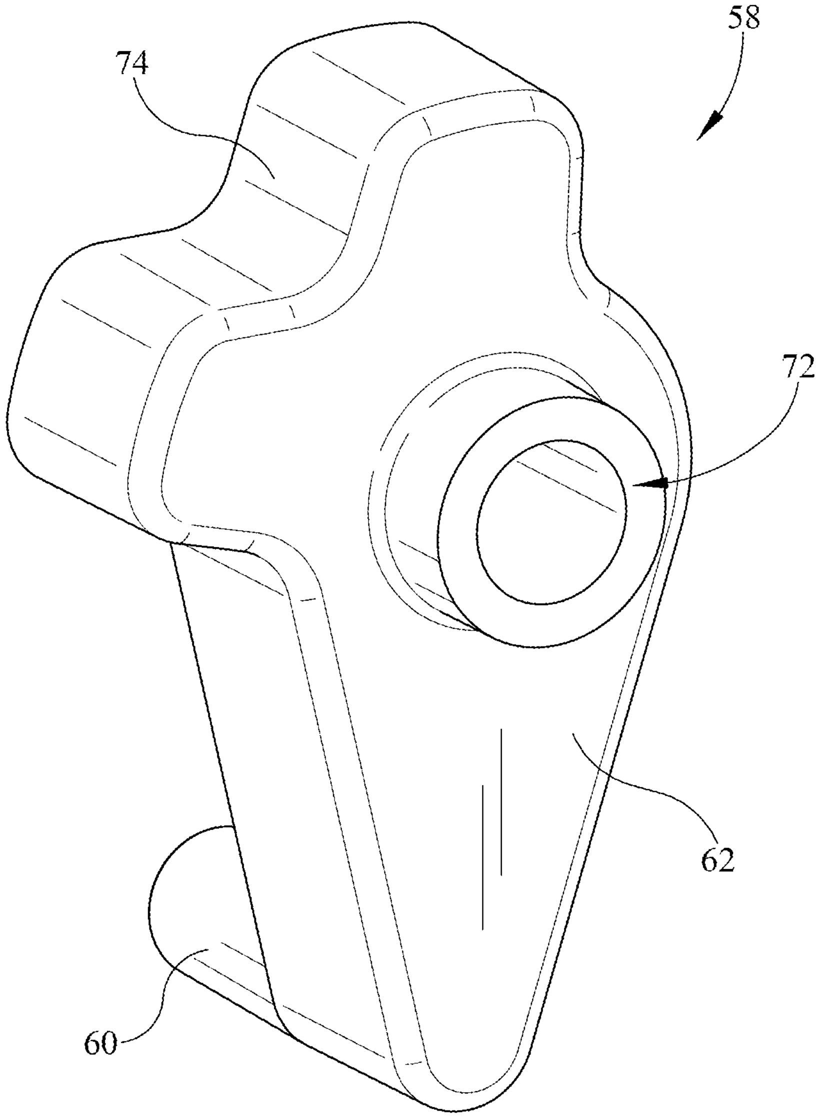
FIG. 9 is a perspective view of a coupler cam of the activation assembly.

The switch assembly 32 and a sheath 56 of the cable assembly 28 are fixed relative to the support 46 so that there is relative motion of the bias member 34, bracket 36, and handle 38 to the switch assembly 32 and sheath 56 that results in activation of the activation arm 30 and, thereby, cable 26. The activation assembly 16 further includes a coupler cam 58 which is secured to the bracket 36 by the pivot pin 40 and a pin 60 which extends from a body 62 of the coupler cam 58 as shown in FIG. 9. The pin 60 extends through a hole 64 formed in the bracket 36 (seen in FIG. 10) and which limits movement of the bias member 34 as will be discussed below. The pivot pin 40 extends through passageway 72 (see FIG. 9) formed in the coupler cam 58 and through bracket 36 as shown in FIG. 11. The pivot pin 40 includes a cross hole 70 which receives a cotter pin, spring pin, or the like, to secure the pivot pin 40. The coupler cam 58 moves freely relative to the pivot pin 40 with sufficient clearance in the passageway 72 for freedom of movement, but the pin 60 secures the coupler cam 58 to the bracket 36 so that the coupler cam 58 moves with the bias member 34, bracket 36, and handle 38.

When the coupler cam 58 moves about pivot pin 40, a cam surface 74 acts on a hook 76 of the activation arm 30 of the switch assembly 32. The cam action of the coupler cam 58 and hook 76 (see FIG. 5) displaces the activation arm 30 to cause the switch assembly 32 to be activated and provide an electrical signal to a control system of the patient support apparatus 10.

Figure 7:
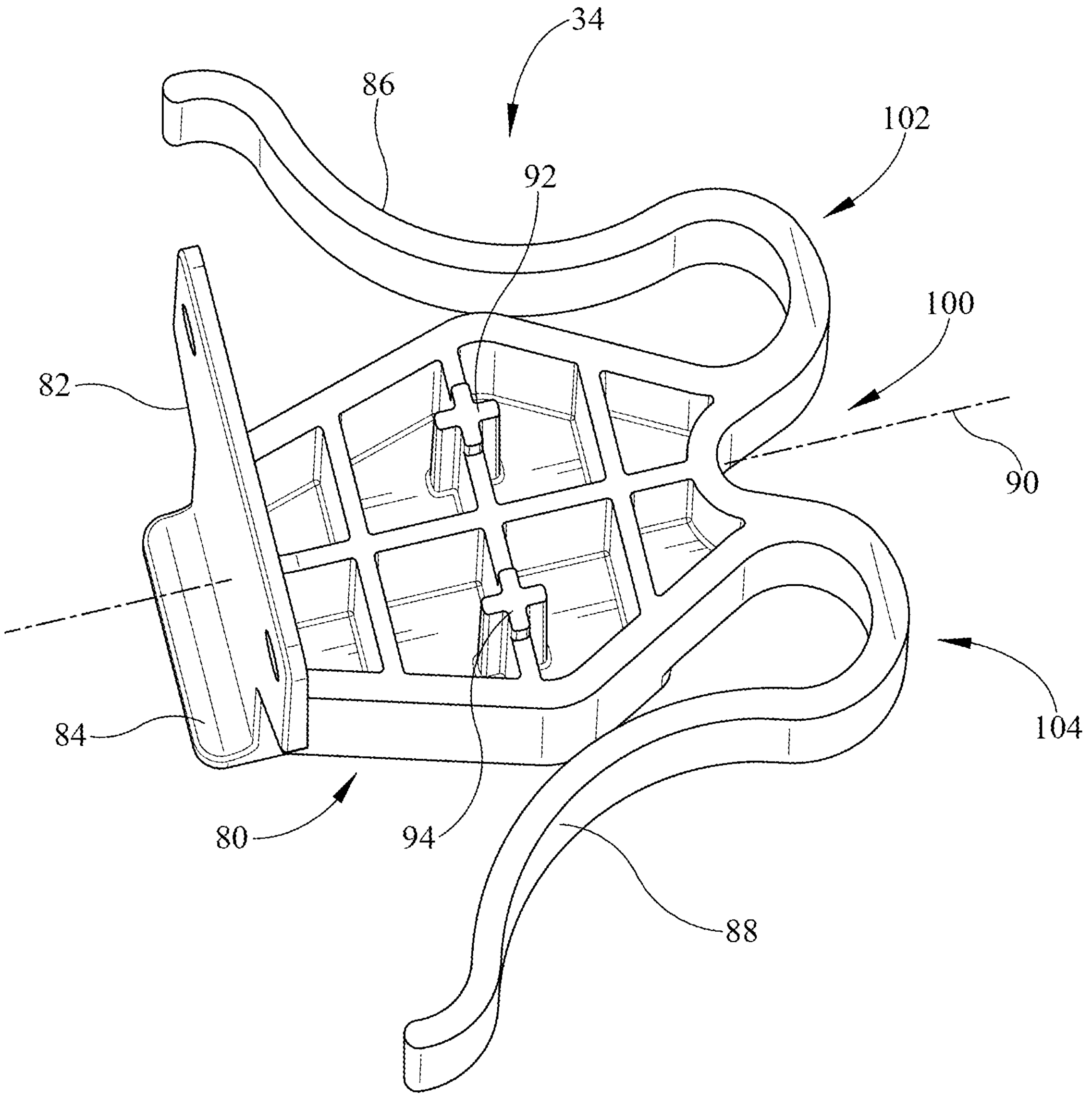
FIG. 7 is a perspective view of bottom of a bias member of the activation assembly.
Figure 8:
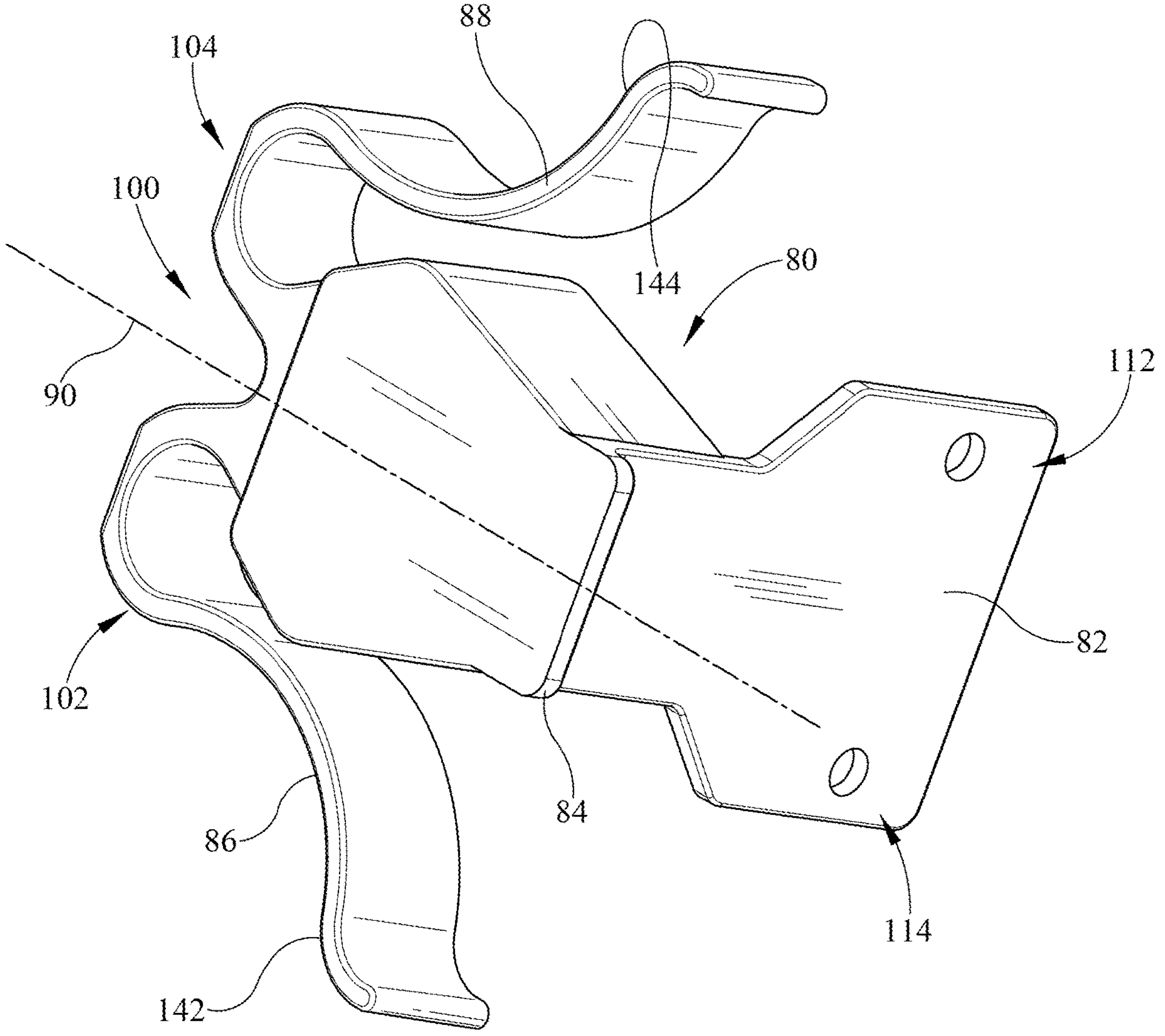
FIG. 8 is a perspective view of a top of the bias member of the activation assembly.

Referring now to FIGS. 7 and 8, the bias member 34 is shown in additional detail. The bias member 34 includes a body 80, a mounting flange 82 extending from the body 80 in a first direction, a guide flange 84 extending from the body 80 in a second direction that is orthogonal to the first direction, and a pair of arms 86, 88 that have a curvilinear shapes that are mirror images of each other. The arms 86 and 88 are mirror images of each other about a centerline 90 of the body 80. The bias member 34 is formed monolithically in the illustrative embodiment and comprises a flexible material that deflects under a load, but is resiliently flexible such that the arms 86 and 88 are biased to return to a neutral position. The bias member 34 further includes two protrusions 92, 94 that extend from the body 80 in the first direction on opposite sides of the centerline 90. The protrusions 92, 94 cooperate with the pin 60, bracket 36, and flanges 50, 52 to control the movement of the bias member 34, and, thereby, other components of the activation assembly 16, 16'. The protrusions 92, 94 are, when the activation assembly 16, 16' is assembled, received in respective slots 96, 98 formed in the bracket 36 which limit movement of the bias member 34 relative to the bracket 36. Additionally, the pin 60 is positioned in the hole 64 formed in the bracket 36 and extends into a space 100 formed between two protuberant portions 102, 104 of the respective arms 86, 88. The bias member 34 is free to move relative to the pin 60, however, extensive movement of the bias member 34 is limited when the pin 60 contacts either of the respective arms 86, 88.

The body 80 is symmetrical about the centerline 90 includes a top 146 with a first side 148 that has a generally planar first surface 150 and a second generally planar second surface 152 offset from the first surface. The body 80 also includes a first end 154 having a first width 156 and symmetrical side walls 158, 160 that define an increasing width of the body for a first distance 162 and a decreasing width of the body for a second distance 164 terminating at the second end 166. The arms 86, 88 extend from the second end.

The arms 86, 88 form complex curvilinear structures that are symmetrical about the centerline 90. The protuberant first sections 102, 104 extend from the second end 166 in the first direction and curve around to have a second section 168 flaring out from the body 80 to a free end 170, 172. The arms 86, 88 have a varying width to control the spring rate of the arms 86, 88. Each of the arms 86, 88 form leaf springs.

Figure 10:
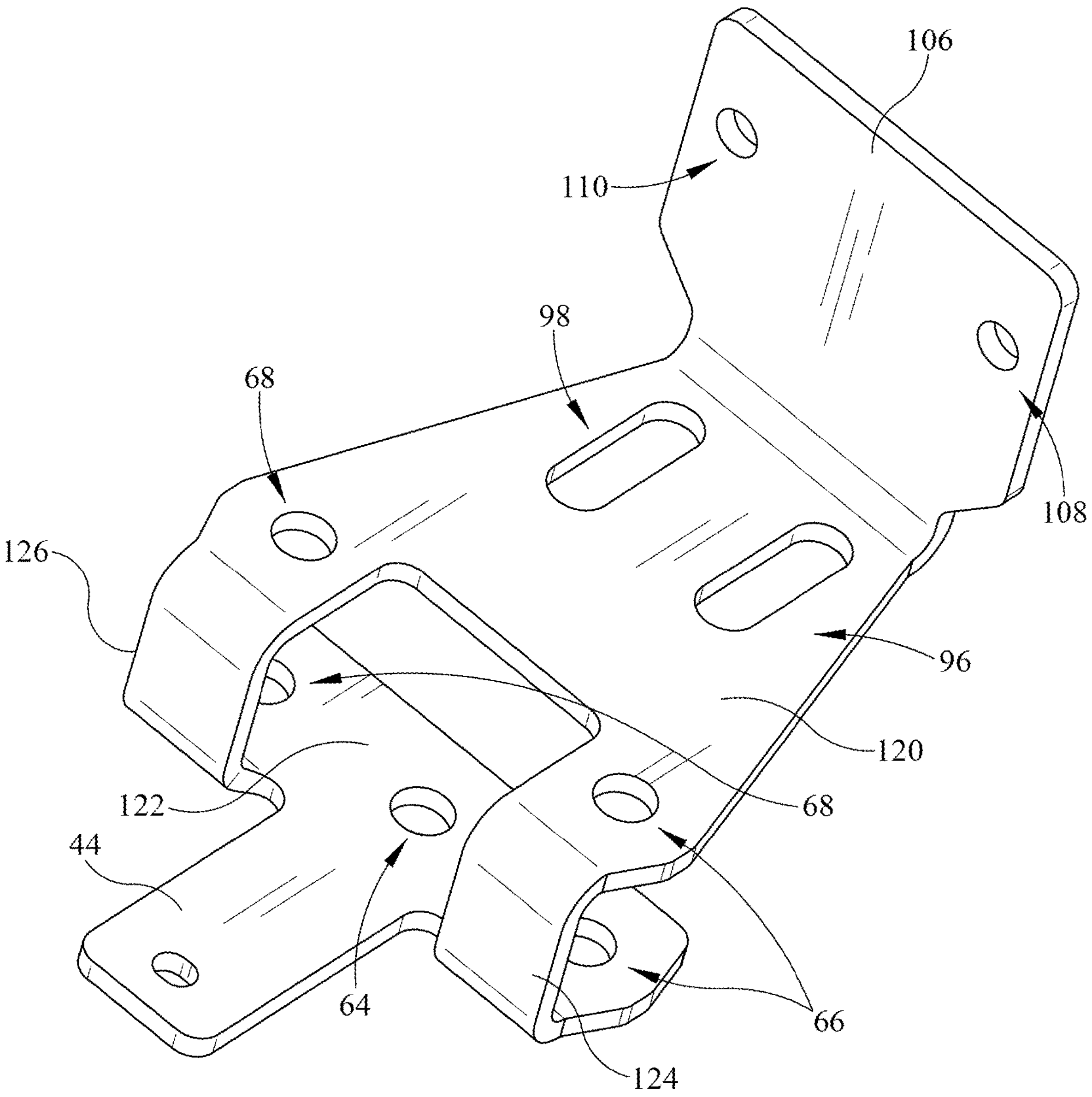
FIG. 10 is a perspective view of a bracket of the activation assembly.

The bracket 36 further includes a flange 106 which is configured to engage the mounting flange 82 of the bias member 34. When the flange 106 is engaged with the mounting flange 82, two holes 108, 110 formed in the flange 106 align with two holes 112, 114 formed in the mounting flange 106 so that fasteners 116 (see FIGS. 3 and 5) may be extended therethrough to secure the handle 38 to the bias member 34 and bracket 36 so that they all move together. Referring to FIG. 10, the bracket 36 includes a planar body 120 from which the flange 106 extends. In addition, the bracket 36 includes an offset backing flange 122 from which the lever arm 44 extends. The backing flange 122 is coupled to the body 120 by a pair of legs 124, 126 which space the backing flange 122 apart from the body 120 to define a space 128 into which the body 80 and arms 86, 88 of the bias member 34 are positioned when the activation assembly 16, 16' is assembled. Referring to FIG. 10, there are two holes 66, 68 in the body 120 which are aligned with another pair of matching holes 66, 68 in the backing flange 122 through which the pivot pin 40 extends when activation assembly 16 or 16' assembled, respectively.

Referring to FIGS. 3 and 4, when a load is applied to a grip 140 of the handle 38 is pulled outwardly by a user, the bias of the arm 88 is overcome such that the assembled bias member 34, bracket 36, and handle 38 rotate about the pivot axis 42 and a surface 142 (see FIG. 8) of the arm 86 engages a surface 144 of the flange 50. Because the bias member 34 is only fully constrained by the engagement with the pivot pin 40 the bias member 34, being resiliently flexible, is relatively free to move relative to the bracket 36 so that there are no specific locations of significant stress through the motion of the handle 38 and until the body 80 of the bias member 34 engages the arm 86. However, in use, the cable 26 is adjusted such that the release mechanism reaches the end of travel prior to, or coordinated with the engagement of the body 80 with the arm 86, thereby greatly reducing the potential for damage to the bias member 34 of other components of the activation assembly 16, 16' during the adrenaline filled actuation of the activation assembly 16, 16' that occurs during an emergency.

Although this disclosure refers to specific embodiments, it will be understood by those skilled in the art that various changes in form and detail may be made without departing from the subject matter set forth in the accompanying claims.

The invention claimed is:

1. An activation assembly for activating a release mechanism of a drive for a patient support apparatus comprising a pivot pin configured to engage a support member of a patient support apparatus, a bracket positioned on the pivot pin and pivotable about the pivot pin relative to the patient support apparatus, the bracket including a lever arm configured to engage a motion transfer link coupled to the release mechanism such movement of the lever arm is transferred through the transfer link to the release mechanism, a bias member engaged with the bracket to move with the bracket and configured to engage a pair of spaced apart motion limiters secured to the support member of the patient support apparatus, the bias member maintaining engagement with both motion limiters when the activation assembly is in a neutral position, and a handle coupled to the bias member, the movement of the handle resisted by the bias member and transferred from the handle to the lever arm.

2. The activation assembly of claim 1, wherein the bias member includes a body and a pair of arms positioned on opposite sides of the body, the arms each configured to engage a respective motion limiter when the activation assembly is in the neutral position.

3. The activation assembly of claim 2, wherein a first one of the pair of arms deflects when the handle is moved in a first direction and a second of the pair of arms disengages the respective motion limiter.

4. The activation assembly of claim 3, wherein the first one of the pair of arms urges the activation assembly to the neutral position when the handle is released.

5. The activation assembly of claim 2, wherein each of the pair of arms form protuberant sections that define a space therebetween and wherein the pin of a coupler cam, when positioned in the hole of the bracket extends into the space between the protuberant sections, the pin constraining movement of the bias member relative to the bracket.

6. The activation assembly of claim 5, wherein the bias member engages with the bracket such that portions of the bias member are free to move relative to the bracket.

7. The activation assembly of claim 2, wherein the bias member engages with the bracket such that portions of the bias member are free to move relative to the bracket.

8. The activation assembly of claim 7, wherein the bias member comprises a body that is symmetrical about a centerline, the body having a top with a first side that has a generally planar first surface and a second generally planar second surface offset from the first surface, a first end having a first width, symmetrical side walls that define an increasing width of the body for a first distance and a decreasing width of the body for a second distance terminating at the second end, the pair of arms extending from the second end.

9. The activation assembly of claim 8, wherein the arms form complex curvilinear structures that are symmetrical about the centerline, the arms each having a protuberant first section that extends from the second end in a first direction, the protuberant first section curving around to have a second section flaring out from the body to a free end, the arm having a varying width to control the spring rate of the arm.

10. The activation assembly of claim 9, wherein the arms form leaf springs.

11. The activation assembly of claim 10, wherein the body has a bottom, opposite the top, with a mounting flange extending from the bottom.

12. The activation assembly of claim 1, wherein the activation assembly further comprises a coupler cam that is positioned on the pivot pin and pivotable about the pivot pin, the coupler cam secured to the bracket to move with the bracket about the pivot pin, the coupler cam including a cam surface configured to engage an activation arm of a switch assembly and activate the switch when the activation assembly is moved from the neutral position to an activated position.

13. The activation assembly of claim 12, wherein the coupler cam includes a pin extending therefrom and the bracket includes a hole in a surface of the bracket, the pin of the coupler cam positioned in the hole of the bracket to secure the pin to the bracket.

14. The activation assembly of claim 1, wherein the bias member comprises a body and a pair of leaf springs that extend from the body, the leaf springs positioned on opposite sides of the body.

15. The activation assembly of claim 14, wherein the thickness of the leaf springs varies along the length of the leaf spring to vary the spring rate of the leaf spring.

16. A patient support apparatus comprising a first frame, a second frame pivotably coupled to the first frame, a drive secured to the first frame and the second frame, the drive operable to move the second frame relative to the first frame, wherein the drive includes a release mechanism which is operable to disengage a portion of the drive to allow the second frame member to move freely relative to the first frame, an activation assembly, the activation assembly including a pivot pin, a bracket positioned on the pivot pin and pivotable about the pivot pin relative to the first and second frame, the bracket including a lever arm engaged with a motion transfer link coupled to the release mechanism such movement of the lever arm is transferred through the transfer link to the release mechanism, a bias member engaged with the bracket to move with the bracket and configured to engage a pair of spaced apart motion limiters, the bias member maintaining engagement with both motion limiters when the activation assembly is in a neutral position, and a handle coupled to the bias member, the movement of the handle resisted by the bias member and transferred from the handle to the lever arm to thereby activate the release mechanism.

17. The patient support apparatus of claim 16, wherein the bias member comprises a body and a pair of leaf springs that extend from the body, the leaf springs positioned on opposite sides of the body.

18. The patient support apparatus of claim 17, wherein the leaf springs engage the motion limiters.

19. The patient support apparatus of claim 18, wherein a first one of the pair of leaf springs deflects when the handle is moved in a first direction and a second of the pair of leaf springs disengages the respective motion limiter.

20. The patient support apparatus of claim 19, wherein the first one of the pair of leaf springs urges the activation assembly to the neutral position when the handle is released.

21. The patient support apparatus of claim 16, wherein the activation assembly further comprises a coupler cam and a switch assembly having an activation arm, wherein the coupler cam is positioned on the pivot pin and pivotable about the pivot pin, the coupler cam secured to the bracket to move with the bracket about the pivot pin, the coupler cam including a cam surface engaging the activation arm of the switch assembly and activates the switch when the activation assembly is moved from the neutral position to an activated position.

22. The patient support apparatus of claim 21, wherein the coupler cam includes a pin extending therefrom and the bracket includes a hole in a surface of the bracket, the pin of the coupler cam positioned in the hole of the bracket to secure the pin to the bracket.

23. The patient support apparatus of claim 16, wherein the bias member engages with the bracket such that portions of the bias member are free to move relative to the bracket.

* * * * *